UNITED STATES PATENT OFFICE.

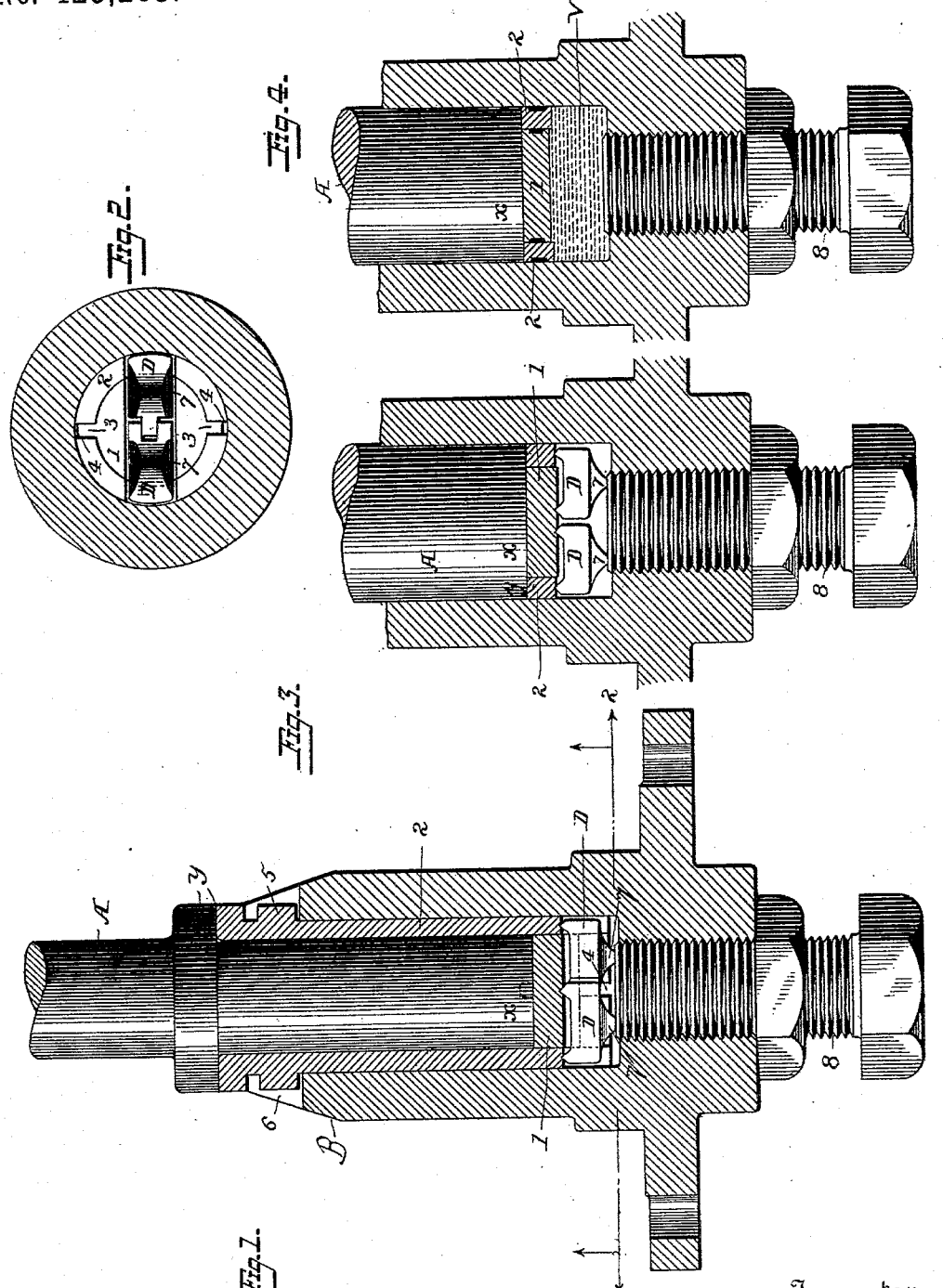

RUDOLPH C. SMITH, OF YONKERS, N. Y., ASSIGNOR TO THD OTIS BROTHERS & COMPANY, OF NEW YORK.

THRUST-BEARING.

SPECIFICATION forming part of Letters Patent No. 425,263, dated April 8, 1890.

Application filed November 5, 1889. Serial No. 329,268. (No model.)

*To all whom it may concern:*

Be it known that I, RUDOLPH C. SMITH, a citizen of the United States, residing at Yonkers, in the county of Westchester and State of New York, have invented certain new and useful Improvements in Thrust-Bearings, of which the following is a specification.

Thrust or step bearings of the usual construction heat and wear unequally because the outside of the step has a greater circumferential speed than that part nearer or at the center. The outside wearing away faster than the center, gradually reduces the bearing area until all the support and wear are at the center and there is unequal abrasion and heat. To avoid these results, I divide the bearing into two independent sections and support these upon the same movable support, through which the pressure on one bearing is transferred to the other to compensate for any wear of the latter.

I have illustrated my invention in the accompanying drawings, in which—

Figure 1 is a longitudinal section of a step-bearing embodying my invention. Fig. 2 is a transverse section on the line 2 2, looking upward; and Figs. 3 and 4 are sectional views illustrating modifications.

The proportions of the step end of the shaft will depend upon the purpose for which it is used, the strain upon it, &c.; but in any case the end bearing-face that takes the thrust is divided into two or more concentric sections, preferably in different planes, and separate bearings for the two sections are supported by the same movable supporters as the opposite ends of levers, whereby the thrust or pressure upon one face is transmitted to the other face, so that if one bearing wears away more rapidly than the other, throwing the thrust upon the other, the pressure upon the latter will operate through the movable support to force the other bearing upon the other face, and thus equalize the pressure and the wear.

In the construction shown in Figs. 1 and 2, the shaft A has one central bearing-section $x$ at the end and another annular section $y$ at a distance from the section $x$, formed by reducing the diameter of the shaft to make a shoulder. In contact with these two bearing-faces are two bearings 1 2, one in the form of a disk and the other annular or in the form of a sleeve. The disk-bearing 1 preferably fits within the sleeve-bearing 2, which thus holds it in place, and ears 3 on the disk-bearing extend into slots 4 in the sleeve, so that the disk cannot turn, the sleeve being prevented from rotating by ears 5 thereon extending into slot 6 in the box B. There is, however, space beyond the bearings sufficient for the longitudinal movement of each and for the reception of balance-levers D D—one, two, or more—each lever in contact at the inner end with the bearing 1, at the outer end with the bearing 2, and having an intermediate fulcrum 7.

Normally each face $x\ y$ of the spindle bears with equal pressure upon its bearing; but inasmuch as the movement of the outer face greatly exceeds in extent that of the inner face the wear of the former is much the greater, so that the latter wears more rapidly, and the weight, thrust, or pressure upon the center bearing would gradually increase did not the levers swing back at the inner ends and forward at the outer ends, thereby forcing the sleeve-bearing against its face $y$, compensating for the wear, thereby maintaining the normal condition of the parts and preventing the usual gradual reduction of the area of the bearing-surfaces.

The bearing-faces $x\ y$ may be on the same plane, as shown in Fig. 3, where, instead of a sleeve, there is a short annular bearing 2, resting on the extreme end of the shaft.

To compensate for wear and secure proper adjustment, the fulcra of the balance-levers may be moved. As shown, the levers bear on the face of a set-screw 8, turning in a threaded opening in the box. By turning the screw the levers are carried toward the end of the shaft until the pressure on the bearings is equalized.

As shown, there are two levers, their ends extending into slots in the sleeve 2, whereby they are kept in place, the inner end of one lever recessed to receive a projection on the end of the other; but there may be three or more levers or any other lever or compensating arrangement. For instance, a body of mercury V may be confined in the space below the bearings 1 2, so that any wear of either bearing more than the other will result in increased pressure upon the latter, and the fluid will be forced against the worn bearing, taking up the wear and equalizing the pressure. By turning the screw the liquid is displaced and the position of the shaft maintained.

Without limiting myself to the precise construction shown, I claim as my invention—

1. A compensating step consisting of bearings seated upon two concentric faces of the shaft and resting upon a movable support, through which the pressure of one bearing is transferred to the other, substantially as described.

2. The combination, with a shaft, of bearings for two concentric faces, and levers supporting the said bearings at their opposite ends, substantially as described.

3. The combination, with a shaft having faces $x\ y$, of a disk-bearing 1, and annular bearing 2, and levers supporting the said bearings at their opposite ends, substantially as described.

4. The combination, with a shaft having a shoulder or face $y$ and end face $x$, of a movable annular bearing, a box supporting the latter, a disk-bearing 1, and levers arranged to receive the thrust of the two bearings, substantially as described.

5. The combination of the shaft, independent bearings adapted to faces at different distances from the center of the shaft, and levers supporting the said bearings and supported upon movable fulcra, substantially as described.

In testimony whereof I have signed my name to this specification in the presence of two subscribing witnesses.

RUDOLPH C. SMITH.

Witnesses:
 EDWD. K. ANDERTON,
 L. F. GOLDMANN.